United States Patent

Semersky

[11] Patent Number: 5,756,172
[45] Date of Patent: May 26, 1998

[54] ANTINESTING PREFORMS FOR BLOW MOLDED CONTAINERS

[75] Inventor: Frank E. Semersky, Toledo, Ohio

[73] Assignee: Plastic Technologies, Inc., Holland, Ohio

[21] Appl. No.: 845,452

[22] Filed: Apr. 25, 1997

[51] Int. Cl.$^6$ ............................................. B65D 1/00
[52] U.S. Cl. ............................... 428/36.92; 428/542.8; 215/10; 215/12.1
[58] Field of Search .................... 428/36.92, 542.8; 215/10, 12.1

[56] References Cited

U.S. PATENT DOCUMENTS 5,366,774  11/1994  Pinto ........................... 428/36.96

Primary Examiner—Charles Nold
Attorney, Agent, or Firm—Donald R. Fraser

[57] ABSTRACT

A tubular preform for a blow molded container. The preform has a closed end and an opposite open end, the relative dimensions of the ends being such that the closed end would be receivable in the open end of a similar preform to nest there were it not for the provision of an antinesting feature in the form of at least one radially outwardly extending protrusion on the outer surface of the closed end of the preform to prevent the entry of the closed end into the open end of the adjacent preform.

2 Claims, 2 Drawing Sheets

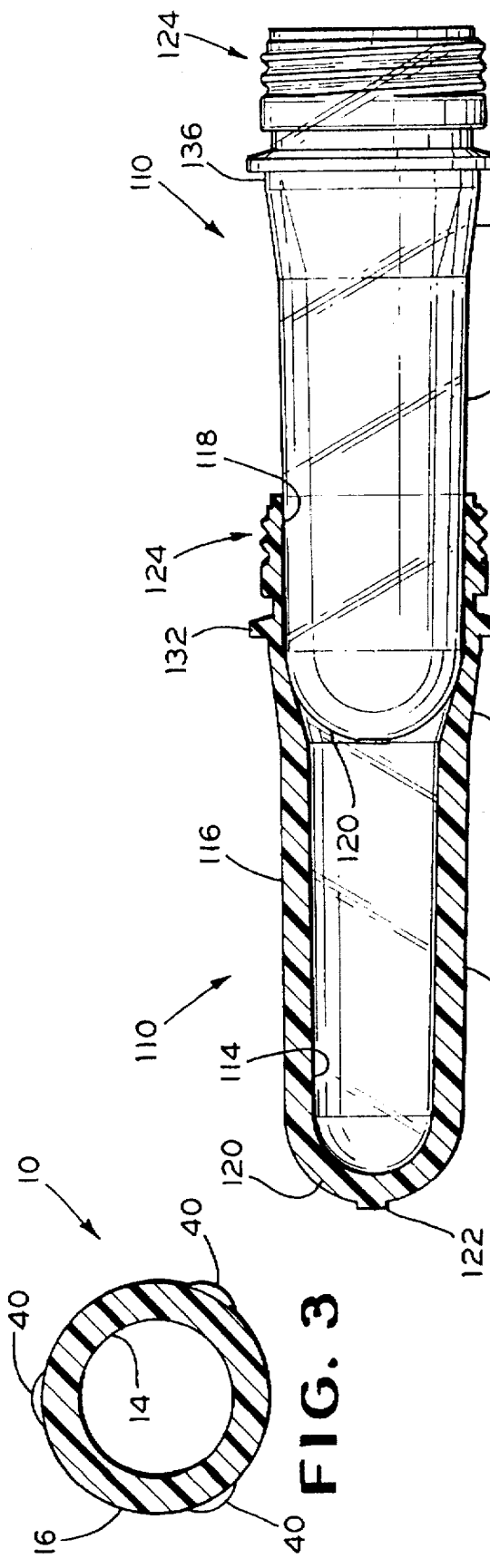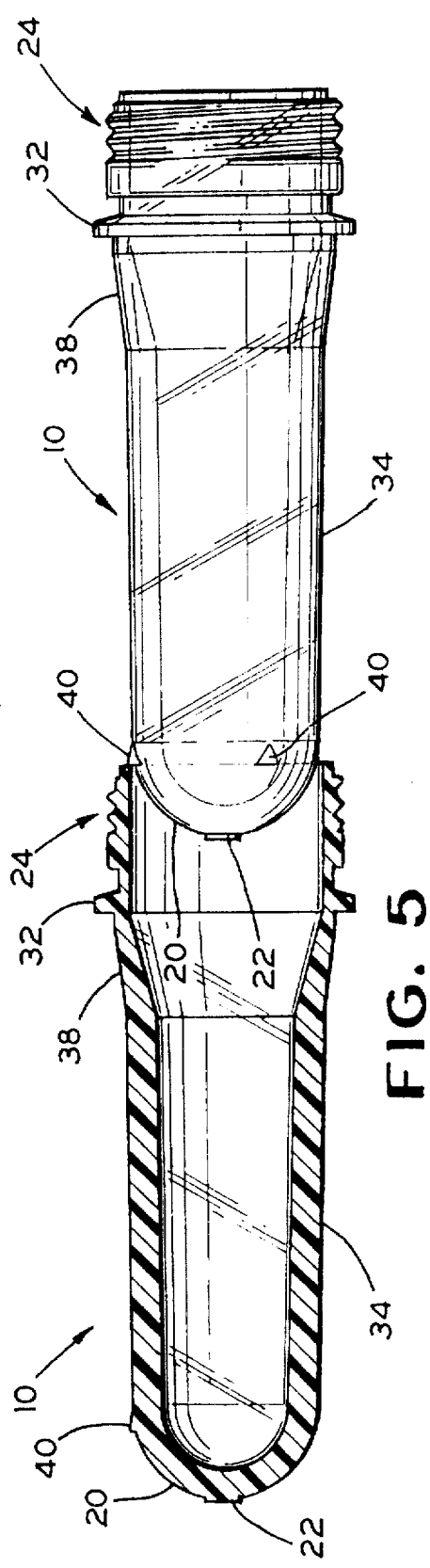

1

ANTINESTING PREFORMS FOR BLOW MOLDED CONTAINERS

BACKGROUND OF THE INVENTION

This invention relates to preforms for blow molded articles, and more particularly, to antinesting preforms for blow molded synthetic resinous containers.

Food and beverage containers formed of PET (polyethylene terephthalate), and particularly PET bottles for carbonated or effervescent beverages, are in common use throughout the world.

PET bottles are commonly formed by the reheat-stretch-and-blow procedure. Though this procedure is well known, it may be described briefly as follows:

Tubular preforms, closed at one end and open at the other, are injection-molded of a suitable grade or formulation of PET. The neck finish, that is, the finish at the open end, is formed in the injection mold in a configuration to receive a suitable closure when the resulting container is filled.

The preforms are removed from the injection mold and allowed to cool to ambient temperature, and are later introduced to a blow molding system where they are first heated to a temperature within the glass-transition range of the material, then mechanically stretched in the longitudinal direction, and finally blow molded to final container configuration and dimensions. The mechanical stretching and blow molding impart biaxial molecular orientation to the material of the container body, thereby enhancing its strength.

The finished containers take a great variety of sizes and configurations. The problem of designing a PET container for a particular purpose presents a wide variety of considerations, among them not only capacity and aesthetic appeal, but economy of material, and importantly, whether the container is to be filled with contents under pressure, as in the case of carbonated beverages, or under vacuum, as in the case of hot filled products.

When container configuration has been determined, an appropriate preform must be designed. Because of the need to conserve material and yet ensure that the material will be so distributed in the finished container that it will exhibit adequate resistance to deformation and rupture under all conditions of expected use, preform design has become an exact science, and an exacting one.

In the case of certain PET bottles intended to package carbonated beverages subject to internal pressures of three to four atmospheres, a preform configuration has evolved in which the outer diameter of the closed end is smaller than the internal diameter of the open end, whereby one preform may, by way of its open end, receive the closed end of an adjacent preform. The preforms are subject to nesting or caning with one another.

Nesting is an impediment to safe and efficient handling. Heretofore, it was necessary to detect and separate nested preforms before damage could occur to them or to the equipment in which they were being processed. In many cases, detection and separation depended exclusively upon the watchfulness and dexterity of a human operator.

To eliminate the problem of nesting of the preforms, the prior art, as illustrated in the U.S. Pat. No. 5,366,774 to H. M. Pinto et al, begins with a preform which in well-known manner comprises a generally tubular body formed of synthetic resinous material about a central axis. The body has inner and outer surfaces surrounding the axis, a first end open to the inner surface, and a second end opposite to the first end. A narrow body portion is adjacent to the second end, and a wide body portion is axially spaced from the second end. The outer surface of the narrow portion has radial dimensions slightly smaller than radial dimensions of the inner surface of the wide portion.

The antinesting feature comprises interference means formed on the inner surface at the wide portion to prevent the narrow portion of a similar preform from nesting within the wide portion.

The interference means preferably comprises at least one projection protruding radially inwardly from the inner surface at the wide portion, such as an axially extending rib.

The interference means comprises, not one, but a plurality of inwardly protruding projections, such as ribs, spaced circumferentially about the inner surface, each of the projections protruding radially inwardly from the inner surface.

The inwardly extending ribs militate against the narrow portion of a similar preform from nesting within the wide portion of the neck finish. The configuration of the neck finish, once established, is not altered in the blow molding procedure and are carried over intact to the finished blown container. Manifestly, the inwardly extending ribs have no function in the finished container and are considered surplusage.

It is an object of the present invention to produce a preform construction which militates against the nesting or caning of adjacent preforms without requiring the use of additional material to form antinesting protrusions.

It is a further object of the invention to produce a preform construction provided with extending protrusions which are, in effect, consumed during the blow molding operation.

Still another object of the invention is to produce a preform construction antinesting or caning protrusions which substantially disappear when the preform is blow molded to produce a finished container.

SUMMARY OF THE INVENTION

The above objects may be achieved by a preform comprising a generally tubular body formed about a central axis and having inner and outer surfaces surrounding the axis, a first end open to the inner surface, a second end opposite to the first end, a wide portion of the tubular body adjacent to the first end, a narrow portion of the tubular body axially spaced from the second end, the outer surface at the narrow portion being a radial dimension smaller than the radial dimension of the inner surface at the wide portion, at least one outwardly extending protrusion located along the outer surface at the narrow portion and protruding radially outwardly from the outer surface of the narrow portion a radial distance greater than the distance between the radial dimension of the outer surface of the narrow portion and the radial dimension of the inner surface of the wide portion to prevent a narrow portion of a similar preform from nesting within the wide portion.

The protrusions, being disposed in that portion of the preform which undergoes substantial stretching, tend to disappear and blend invisibly into the finished blow molded container.

These and other features, advantages and objects of the invention will be apparent from the ensuing description taken in conjunction with the accompanying drawings.

BRIEF DESCRIPTION OF THE DRAWINGS

The above, as well as other objects and advantages of the invention will become readily apparent to one skilled in the art from reading the following detail description of the preferred embodiments in the light of the accompanying drawings, in which:

FIG. 3 is an sectional view of the preform illustrated in FIG. 2 taken along line 2–3 thereof;

FIG. 4 is a view illustrating the prior art wherein a conventional preform with an adjacent conventional preform nested within it; and FIG. 5 is a view similar to FIG. 4 showing a preform constructed in accordance with the invention in longitudinal section, and a similar preform adjacent thereto at the open end thereof.

DETAILED DESCRIPTION OF THE PREFERRED EMBODIMENT

Figure 1:
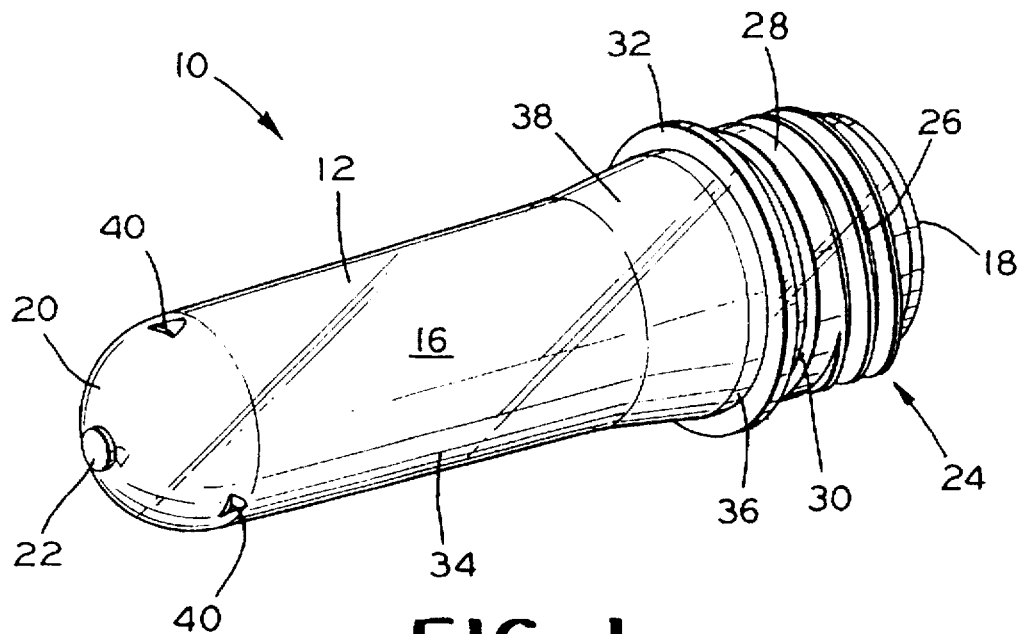
FIG. 1 is a perspective view of a preform constructed in accordance with the present invention.
Figure 2:
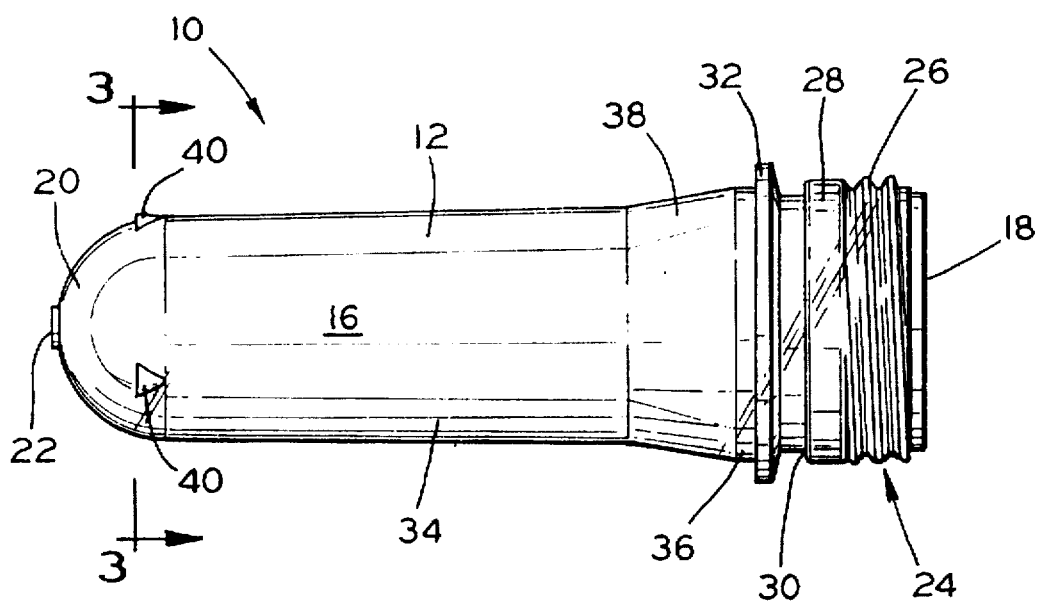
FIG. 2 is a side view of the preform of FIG. 1.

Referring particularly to FIGS. 1, 2, and 3, there is shown a preform generally indicated by reference numeral 10 for forming a blow molded container (not shown) intended for the packaging of contents under pressure such as carbonated beverages. Preform 10 has preferably been injection molded of PET and is ready to be reheated, stretched, and blow molded into final container configuration by the procedure described hereinabove.

The preform 10 comprises a generally tubular body 12 having a central axis (not shown) and having an inner surface 14 and an outer surface 16 surrounding the central axis.

A first end 18 of preform 10 is open to the inner surface. A second end 20, opposite to the first or open end, is closed in a generally hemispherical configuration and is shown bearing a hub 22 of excess material (FIGS. 1 and 2) formed at the gate of the injection mold.

Provided adjacent to open end 18 is a neck finish generally represented at 24 and formed in its final or container configuration in the injection mold. The neck finish includes male threads 26 adapted to mate with female threads formed in a conventional closure (not shown) to be applied when the container blow molded from the preform 10 has been filled and the closure received over open end 18 of the preform. Neck finish 24 also includes a circumferential band 28 which provides a step 30 for retaining a breakaway tamper-indicating element (also not shown) of the closure on the container in well-known manner when the remainder of the closure is removed to provide access to the contents of the container.

A circumferential flange 32 is provided in this instance for use in handling the preform and the resulting container on processing and filling lines. Flange 32 is also useful to the consumer in pouring from the container, since it assists in affording a firm grip on the neck thereof. The configuration of neck finish 24 and flange 32, once established in the injection mold, are not altered in the blow molding procedure, whereby they are carried over intact to the blown container.

The remainder of body 12 of the preform comprises a barrel 34 which extends from flange 32 in the opposite direction from neck finish 24. Barrel 34 comprises an annular portion 36 adjacent to flange 32, a frusto-conical portion 38 adjacent to the annualar portion 36 and opposite to flange 32, and then tapers from the frusto-conical portion 38 and terminates in the narrow hemispherical closed end 20.

In the illustrated embodiment, there are three spaced apart protrusions 40, which extend outwardly from the outer surface 16 of the narrow end portion 20.

It will be noted that, among other things, the configuration of the barrel as described affords ready removal of the preform from its cavity in the injection mold and ready separation from the injection-mold core. It is the barrel that is mechanically stretched in the axial direction from reheating of the preform and before the container is blow molded from it.

Referring now to FIG. 4, in which reference numerals are one hundred greater than the reference numerals identifying corresponding features in FIGS. 1, 3 and 5, there are shown a pair of conventional or prior-art preforms constructed substantially in the manner thus far described. Because the radial dimensions of outer surface 116 of each of the preforms 110 depicted in FIG. 4 are smaller at the closed end 120 (and at tapered portion 140) than the radial dimensions of the inner surface 114 at the open end 118, one preform is able to nest to a substantial degree within the other, as illustrated in FIG. 4.

Preforms according to the present invention, however, are provided with an antinesting feature in the form of interference means provided on outer surface 16 at the narrowest portion of body 12; that is, at closed end 20. In the embodiment illustrated in FIGS. 1 and 2, the interference means takes the form of a plurality of protrusions 40 protruding radially outwardly from outer surface 16. The protrusions 40 are substantially triangular in shape.

As is shown in FIG. 5, the interference means or protrusions 40 act as obstacles to the insertion of the narrow end 20 of the preform into the open end 18 of an adjacent preform.

It will be understood that the protrusions 40 are effective to militating against the nesting of adjacent preform by increasing the effective diameter of the narrow hemispherical closed end 20. However, the increase in effective diameter of the narrow hemispherical closed end 20 is achieved through the use of a minimal amount of additional plastic starting material.

The cosmetics of the finished blow molded container formed by blow molding the aforedescribed preform is of considerable consequence. The present invention results little or no adverse appearance in the finished container. It has been found that the protrusions 40 in the preform effectively disappear in the finished container. This feature is believed to be accomplished by the material of the protrusions 40 during the reheating and blow molding operation wherein the plastic material comprising the protrusions tends to flow into the adjacent material and tend to substantially disappear.

It will be quite apparent to one skilled in the art that the aforedescribed invention has produced a preform construction for producing a plastic blow molded container wherein the preform is of a construction which militates against the nesting or caning of preforms and does not require any additional starting material to achieve the objections.

While the invention has been described in connection with certain specific embodiments thereof, it will be understood that this is by way of illustration and not of limitation and that the scope of the appended claims should be construed as broadly as the prior art will permit.

What is claimed is:

1. A preform for a blow-molded container, comprising:
   a generally tubular body formed about a central axis and having inner and outer surfaces surrounding the axis, a first end open to the inner surface, a second end opposite to the first end, a wide portion of the tubular body adjacent the first end, a narrow portion of the tubular body axially spaced from the second end, the outer surface at the narrow portion having a radial dimension smaller than the radial dimension of the inner surface at the wide portion, wherein the improvement comprises:

at least one outwardly extending protrusion located along the outer surface at the narrow portion and protruding radially outwardly from the outer surface of the narrow portion a radial distance greater than the distance between the radial dimension of the outer surface of the narrow portion and the radial dimension of the inner surface of the wide portion to prevent a narrow portion of a similar preform from nesting within the wide portion.

2. A preform according to claim 1, wherein the rib is triangular in transverse section.

* * * * *